United States Patent
Betts

(10) Patent No.: US 6,534,196 B2
(45) Date of Patent: Mar. 18, 2003

(54) REFRACTORY METAL COATED ARTICLES FOR USE IN MOLTEN METAL ENVIRONMENTS

(75) Inventor: Robert K. Betts, Milford, OH (US)

(73) Assignee: Cincinnati Thermal Spray, Cincinnati, OH (US)

(*) Notice: Subject to any disclaimer, the term of this patent is extended or adjusted under 35 U.S.C. 154(b) by 68 days.

(21) Appl. No.: 09/792,909

(22) Filed: Feb. 26, 2001

(65) Prior Publication Data

US 2002/0119343 A1 Aug. 29, 2002

(51) Int. Cl.$^7$ .............................. B32B 15/00; B25F 5/02
(52) U.S. Cl. ....................... 428/661; 118/400; 266/275; 428/627; 428/632; 428/633; 428/655; 428/656; 428/663; 428/664; 428/678; 428/380; 428/381; 428/384; 428/389; 428/926; 428/934; 428/937; 492/49; 492/53; 492/54
(58) Field of Search ................. 428/661, 627, 428/632, 633, 655, 656, 663, 664, 678, 380, 381, 384, 389, 926, 934, 937; 266/275; 118/400; 492/49, 53, 54

(56) References Cited

U.S. PATENT DOCUMENTS

| | | | | |
|---|---|---|---|---|
| 2,839,292 A | * | 6/1958 | Bellamy | 266/225 |
| 3,006,782 A | | 10/1961 | Wheildon, Jr. | 428/663 |
| 3,837,894 A | | 9/1974 | Tucker, Jr. | 428/679 |
| 4,485,151 A | | 11/1984 | Stecura | 428/633 |
| 4,588,655 A | | 5/1986 | Kushner | 428/633 |
| 4,912,835 A | | 4/1990 | Harada | 492/3 |
| 5,236,787 A | | 8/1993 | Grassi | 428/552 |
| 5,310,476 A | | 5/1994 | Sekhar et al. | 205/230 |
| 5,360,675 A | | 11/1994 | Wood et al. | 428/631 |
| 5,370,372 A | | 12/1994 | Eckert | 266/275 |
| 5,759,142 A | * | 6/1998 | Perdikaris | 492/54 |

FOREIGN PATENT DOCUMENTS

JP     2417394     12/1990

OTHER PUBLICATIONS

Kay, et al. Iron and Steel Engineer, May 1989, pp. 32–34.
Samsonov, et al., Coatings of High Temperature Materials, pp. 99, 103, 105, Plenum Press, New York, 1966 (No month).

* cited by examiner

Primary Examiner—Robert R. Koehler
(74) Attorney, Agent, or Firm—Frost Brown Todd LLC

(57) ABSTRACT

The present invention relates to articles, having an extended useful life, which are used in contact with high temperature molten aluminum or molten zinc baths. One aspect of the invention encompasses articles, such as bearings, bushings, couplings or rollers, used in contact with molten aluminum or molten zinc which is coated with a high density coating consisting of a metal selected from Groups Vb, VIb, or VIIb metals (preferably molybdenum or tungsten), in pure or alloyed form. These coatings generally have a thickness of from about 0.06 to about 0.30 inch. Another aspect of the present invention encompasses a roll for guiding steel strip through a high temperature aluminizing bath, which utilizes a multi-layer structure, the first primer layer being a Group Vb, VIb or VIIb metal, preferably tungsten or molybdenum (in pure or alloyed form), the second layer comprising MCrAlY in which M is either nickel or cobalt, and the third layer comprising a refractory metal oxide of Al, Zr, Si or Cr.

30 Claims, No Drawings

REFRACTORY METAL COATED ARTICLES FOR USE IN MOLTEN METAL ENVIRONMENTS

TECHNICAL FIELD

The present invention relates to refractory coatings on articles, such as bearings, bushings, couplings or rollers, used in a molten metal environment, such as in aluminizing or galvanizing processes.

BACKGROUND OF THE INVENTION

Aluminizing and galvanizing processes take place at very high temperatures. For example, a 100% aluminum aluminizing bath typically can have a temperature of 1,325° F. (720° C.). In order to run these processes effectively, in an industrial context, it is necessary to have various metal parts, such as bearings, bushings, couplings or rollers, immersed wholly or partly in the aluminizing or galvanizing bath such that the metal pieces or strip to be coated can effectively and efficiently move through the bath. Such baths tend to be very destructive of these metal parts due to rapid metallurgical alloying of the reactive molten metal with the commonly used structural alloys. This results in frequent stoppage of the process so that the parts can be replaced to allow the process to continue. The more frequently the process has to be stopped to replace such parts, the less efficient it is and the greater the running cost of the process. Therefore, designing metal parts which can remain intact in the aluminizing or galvanizing baths for a longer period of time would be highly desirable. It is that goal which the present invention addresses.

The use of refractory metals as coatings for metal parts is known in the art. For example, U.S. Pat. No. 2,839,292, Bellamy, issued Jun. 17, 1958, describes that molybdenum and tungsten coatings on metal parts are highly resistant to attack when immersed in molten aluminum. The coatings can be applied by spraying (which is preferred), plating or cladding. There is no disclosure of the use of high density refractory metal coatings. The patent utilizes an outer ceramic layer to protect the parts from oxidation.

U.S. Pat. No. 5,360,657, Wood, et al., issued Nov. 1, 1994, describes a molybdenum (3% to 9% Mo) boron alloy which is said to show excellent resistance to attack by molten zinc. The patent deals very specifically with molten zinc, discussing its low viscosity and surface tension, and does not deal with molten aluminum at all. Further, there is no discussion of tungsten coatings or of application by any means other than thermal spray. Finally, the patent (at column 5, lines 20–27) demonstrates that a pure molybdenum coating is clearly inferior to the molybdenum-boron alloy coating.

U.S. Pat. No. 5,759,142, Perdikaris, issued Jun. 2, 1998, discloses an aluminizing process guide roll, said to provide longer wear, which utilizes a multi-layer coating on the roll's surface including a first coating layer comprising MCrAlY metal in which M is Ni or Co, and a second coating layer of a refractory oxide of aluminum, zirconium, silicon or chromium. The patent teaches that the MCrAlY coating must be placed directly against the surface of the guide roll and that there not be any intermediate layers between them.

U.S. Pat. No. 5,310,476, Sekhar, et al., issued May 10, 1994, teaches the formation, utilizing a micropyretic heating process, of a coating made from a refractory material, such as molybdenum or niobium compounds. These coatings are said to be inert to damage from molten aluminum.

U.S. Pat. No. 5,370,372, Eckert, issued Dec. 6, 1994, describes a ladle used for working with molten metal (such as aluminum) which is said to be resistant to damage caused by the molten metal. The ladle may be made from niobium or molybdenum, among other materials, and has a refractory oxide coating which comprises at least one of alumina, zirconia, yttria-stabilized zirconia, magnesia, magnesium titanate, mullite, or a combination of alumina and titania.

SUMMARY OF THE INVENTION

The present invention relates to two different, but related, refractory metal coatings used to protect metal parts placed in a molten metal environment.

The first embodiment is an article used in contact with molten aluminum or molten zinc, particularly molten aluminum, which is coated with a high density coating consisting of a metal selected from the group consisting of Group Vb, VIb and VIIb metals (in pure or alloyed form). The coatings generally have a thickness of from about 0.01 to about 0.30 inch. The articles are generally in the form of a bearing, bushing, sleeve, coupling or roller. Preferred metals are the Group VIb) metals, particularly molybdenum and tungsten, most particularly in pure form. Examples of high density coating application methods which may be used in this embodiment of the present invention include plasma-transferred arc, welding overlay, and high-velocity arc spraying processes. These parts may optionally be provided with an aluminum-based or similarly effective overlay to provide oxidation protection to the part prior to immersion.

The second embodiment of the present invention is a roll for guiding strip steel through a high temperature aluminizing bath, said roll comprising a roll body having a surface in guiding contact with said steel strip within said bath and a multi-layer coating on said roll's surface for contact with said steel strip, said multi-layer coating including a first primer layer on said roll's surface, comprising a group Vb, VIb or VIIb metal, particularly tungsten or molybdenum, either as pure metal or an alloy; a second layer comprising MCrAlY metal in which M is Ni or Co, said MCrAlY metal being thermally sprayed on said primer layer; and a third layer comprising a refractory metal oxide of aluminum, zirconium, silicon or chromium, said third layer having a higher porosity than said second layer to better accommodate thermal expansion coincident with bath immersion without disruption of the third layer surface, while the less porous MCrAlY metal second layer and the first layer maintain effective metallurgical corrosion protection of said roll surface.

All percentages and ratios given herein are "by weight," unless otherwise specified.

DETAILED DESCRIPTION OF THE INVENTION

In its first aspect, the present invention encompasses articles used in contact with molten aluminum or molten zinc which are coated with a high density coating consisting of certain specific refractory metals. The articles are any of a variety of articles which typically would be immersed either wholly or partially in a bath of molten aluminum or molten zinc during the aluminizing or galvanizing process and can include, for example, bearings, bushings, sleeves, couplings and rollers. The metals which are utilized for the coating are selected from the group consisting of Group Vb, VIb and VIIb metals, including, for example, molybdenum, tungsten, niobium, tantalum, and rhenium. The Group VIb metals are preferred, with molybdenum and tungsten being particularly preferred.

The metals may be applied in either pure or alloyed form, with pure form being preferred. The metals are applied to the article in the form of a high density coating having controlled and minimized microstructural porosity. As used herein, "high density" means a coating which has a porosity of no greater than about 15%, preferably no greater than about 5%, based on the metallographic examination technique common in metallurgical practice. Such application methods include, for example, plasma transferred arc (which is preferred), welding overlay, and high velocity plasma arc spraying in either air, protective cover (gas or water) or low atmospheric pressure chamber. These application methods provide a coating which is dense and which forms an intimate bond with the substrate. The coating could also be formed as a sleeve which is applied and bonded to the substrate. In the plasma transferred arc method, the coating material (e.g., molybdenum) is melted to form the coating, but the substrate is not extensively melted; the coating therefore is not diluted significantly upon application. Lower density application methods, such as thermal spray, plating or cladding are not suitable for use in the present invention. When applied as described herein, the articles of the present invention exhibit a much longer useful life when utilized in a molten aluminum or molten zinc bath, most preferably a molten aluminum bath. The coatings generally have a thickness of from about 0.01 to about 0.30 inch, more preferably from about 0.02 to about 0.06 inch. In coatings useful in the present invention, thickness and density are inversely related, i.e., thinner coatings can be used if they have higher densities. These coatings are both wear resistant and protect the underlying article from wear by the molten metal.

The article of the present invention may additionally include, over said high density refractory metal coating, an outer coating of an oxidation-resistant material. Such materials are well known in the art and, for example, include aluminum metal, zinc metal, NiCr, MCrAlY in which M is Ni or Co, and mixtures thereof. It is preferred that this outer layer be made from aluminum and have a thickness of from about 0.001 to about 0.015 inch. This outer coating may include application of a metal or ceramic pigmented paint, as well as metal spray techniques, suitable for oxidation protection during pre-heat exposure.

The present invention also encompasses an apparatus for coating metal strip with aluminum or zinc (preferably aluminum) comprising a reservoir for holding molten aluminum or molten zinc and, positioned such that it is at least partially submersed in said molten aluminum or zinc, an article selected from bearings, bushings, couplings and rollers, said article being coated with a high-density coating consisting of a metal selected from the group consisting of Group Vb, VIb and VIIb metals, such as molybdenum, tungsten, niobium, tantalum and rhenium, in pure or alloyed form. These coatings have a thickness of from about 0.01 to about 0.30 inch, preferably from about 0.02 to about 0.06 inch.

In its second embodiment, the present invention encompasses rollers used for guiding steel strip through a high temperature aluminizing bath. While such rollers are known in the art (see, for example, U.S. Pat. No. 5,759,142, Perdikaris, issued Jun. 2, 1998, incorporated herein by reference), the rollers of the present invention provide significant and unexpected benefits in terms of extended useful life when used in a molten aluminum bath. Specifically, and surprisingly, while the Perdikaris patent describes aluminizing rollers which include an MCrAlY layer with an outer coating of refractory oxide, that patent specifically teaches that, in order to be effective, the MCrAlY layer must be situated directly against the surface of the aluminizing roller. The present invention is not only based on the fact that this is not correct, i.e., that the MCrAlY layer does not have to be directly against the outer surface of the roller, but also on the fact that by incorporating a first (primer) layer made from a refractory metal, preferably tungsten or molybdenum, either as pure metal or as an alloy, the durability or useful life of the rollers is significantly improved.

The basic aluminizing rolls utilized in the present invention are those utilized for guiding steel strip through a high temperature aluminizing bath. These rolls are well known in the art and comprise a roll body which has a surface in guiding contact with the steel strip within the bath. Such rolls are disclosed, for example, in U.S. Pat. No. 5,759,142, Perdikaris, issued Jun. 2, 1998, incorporated herein by reference. On the surface of this roll of the present invention is placed a first (primer) layer of a Group Vb, VIb or VIIb metal, preferably tungsten or molybdenum, either as pure metal or in alloy form. It is preferred that the coating be applied as a pure metal. The coating may be applied by any method known in the art (for example, thermal spray, plating, cladding), with thermal spray application being preferred. The high-density coatings, described above (e.g., plasma transferred arc) may also be utilized. This initial layer generally has a thickness of from about 0.002 to about 0.05 inch, with a thickness of from about 0.002 to about 0.007 inch being preferred.

The second layer, which is placed on top of and adjacent to the first (primer) layer, comprises MCrAlY metal in which M is nickel (Ni) or cobalt (Co). These coatings are well-known in the art and are described in, for example, U.S. Pat. No. 5,759,142, Perdikaris, Jun. 2, 1998, incorporated herein by reference. Such layer may be applied in any manner known in the art, with thermal spray application being preferred. The preferred material for use in forming the second layer is NiCrAlY. The coating is generally applied to a thickness of from about 0.002 to about 0.015 inch, with a thickness of from about 0.004 to about 0.006 inch being preferred. It is preferred that the second layer has a porosity in the range of from about 1% to about 10%.

The third layer, which is placed on top of and adjacent to the second layer, comprises a refractory metal oxide of aluminum (Al), zirconium (Zr), silicon (Si) or chromium (Cr), or mixtures thereof. This third layer has a higher porosity than the second layer in order to better accommodate thermal expansion of the metal member coincident with pre-heat and subsequent immersion into the high temperature molten aluminum bath (around 1325° F.). The third layer may be applied in any manner conventionally known in the art, although thermal spraying is preferred. The preferred material for use in this third layer is a refractory oxide mixture of zirconia and alumina. The third layer is generally applied to a thickness of from about 0.01 to about 0.05 inch (although it can be thicker), with from about 0.012 to about 0.032 inch being preferred, the third layer preferably having a porosity of from about 4% to about 15%. Once again, such layers are well-known in the art and are disclosed, for example, in U.S. Pat. No. 5,759,142, Perdikaris, issued Jun. 2, 1998, incorporated herein by reference.

Optionally, between the second and third layers, the roll may incorporate a blend layer which includes a mixture of from about 25% to about 75% (by weight) of the material from the second layer and from about 75% to about 25% (by weight) of the material from the third layer. This blend layer helps to accommodate thermal expansion of the roll. Primer may also be included in this blend layer.

Finally, an optional sealer coating (such as boron nitride) may be placed on the surface of the coated roll to provide an initial barrier.

In use, when the otherwise inert outer oxide layer, which is protecting the roll from attack by molten aluminum, is physically breached by the liquid metal, through inevitable stress/strain cracks, the refractory metal components which may be incorporated into the underlying second, as well as being first (primer), layer are far more resistant to the encroaching aluminum than the MCrAlY coating. Using these elements, or alloys of them, as the metallic component of the coating will make the composite coating less vulnerable to deterioration by aluminiding (i.e., metallurgical reaction with the aluminum). Secondly, the coating will hold off aluminiding and metallurgical corrosion of the roll itself from aluminum diffusion. The benefit of this concept is extended life for the coated roll, as the bulk applied coating structure, having preferred porosity, with composite layering including the aluminide-deferring refractory metal components, remains protective of the roll for longer runs.

The following examples are intended to illustrate, but not limit the scope of the present invention.

EXAMPLES

In these examples a roller part comprises a cylindrical tube of Fe-based alloy for the purpose of guiding steel strip in the molten metal bath to be thus coated by the molten metal. The roller is some 30" diameter and 60" long. Its ends are fitted with Fe alloy hub plates and an axle rod, the ends of which extend some 12" from its axial centerline to provide for positioning, support and cylindrical rotation about its centerline. Said axle ends are fitted into the ends of arms of a larger frame which supports the roller for immersion into the pot containing the molten metal. The purpose of this arrangement is for the roller to have steel strip passing around it, thus to guide the strip through the molten metal and thereby become coated by it. The passing strip continuously rotates the roller thus causing the supporting axle to rotate in the fixture arms. The axle end may be bare or may be fitted with a cylindrical sleeve, usually of cobalt alloy. These arms have attached cylindrical or segmented bushings which maintain contact with the sleeve. This assembly, in particular the rotating mating surfaces, is collectively termed the journal. It is the main function of the journal to keep the roller properly aligned for strip passage and rotating continuously with the passing strip so said strip is not subject to scraping and marring should the roller not rotate freely.

The bearing surfaces of said journal, though in a liquid metal environment, are subject to a wear mechanism, a common definition being abrasion, as the axles or sleeves rotate against the mating stationary support arm bushings. This is due in large part to hard particles of abrasive Al oxide which are formed and are always present within the bath due to normal process chemical phenomena. Said particles carried between the journal surfaces cause abrasive wear and associated material loss from journal surfaces. Said mechanism is greatly promoted by the metallurgical reaction of journal metal surfaces with the molten aluminum which reacts to form metal aluminide at those surfaces, more brittle and less abrasion resistant than journal bearing metal alloys. The effect of loss of material is reduction of axle size, making it prone to breaking. Corresponding change in the size of the mating journal arm bushing can cause the roller rotation to chatter. Such actions shorten useful life of the roller causing shutdown for replacement. Longer trouble-free operation is desirable. Said sleeves are commonly made of Co-based alloys, which in air or oil bearing use have excellent wear resistance. In the molten Al bath, however, they are subject to the described metallurgical and consequent abrasion effects. To alleviate this, it is necessary to provide a bearing material which is less reactive with the molten metal, thus providing longer useful service life.

The first example uses 1" diameter rods of an Fe alloy dipped in molten Al to demonstrate that the disclosed metals are resistant to a molten metal bath of actual process composition and temperature. Said rods were coated with tungsten using a commercial plasma transferred arc (PTA) method. They were coated in an overlapping spiral pattern to a length of about 12". Power, feed rate, rotation and traverse parameters were used to successfully melt the W metal particles to at least liquify their outer surfaces such that when projected to the rod surface they would coalesce and reform a coating layer as they solidified. Parameters were further controlled to sufficiently melt the rod surface to accept and alloy with the applied W for adhesion, but with minimum dilution by the base metal.

Rods were coated as well with two other Co-based alloys approximately 0.050" thick:

1. W metal
2. Co alloy S4
3. Co alloy T9

These three rods were then delivered to a steel mill for immersion into a working Al coating pot, utilizing the equipment to perform the described coating of strip steel. The rods were affixed to holders which submerged the coated ends into the molten Al metal for about 12 days. They were then examined by sectioning and metallographic polishing for microscope viewing. The observed result was that, during the immersion, the Co alloys had experienced metallurgical alloying by the Al. Aluminide formation had progressed through each and into the base metal of the rods.

In contrast, the W, of similar applied thickness, was only partially aluminided to about ⅓ its original thickness. The remaining unaffected applied tungsten coating covered and protected the base metal rod. Said result, extrapolated to an actual journal part, indicates that the tungsten would provide substantially more resistance than Co alloys to molten metal attack in an actual commercial aluminizing pot.

Because dip testing is static immersion, it is without the harsh effect of functional abrasive wear and other dynamic effects of actual service, therefore, standard journal sleeves were tested in further trials. These sleeves were coated on their OD surfaces with W by the same PTA process to about 0.060–0.070" thickness. The OD was then finished by grinding to a diameter leaving about 0.030–0.040" thickness of W metal coating, based on original diameter. Said W overlay on the sleeves was finally coated by thermal spray with 0.004–0.007" thickness of Al metal. Said top coat provides oxidation protection for the W during subsequent preheating in air during roller preparation for pot immersion. Coated sleeves were then pressed onto the axle ends of a roller and secured by normal welding method. Said roller was assembled to the journal support frame, preheated and eventually immersed for strip coating operations, for a campaign of about 14 days.

Following the campaign, the roller was removed for normal cycle replacement. It was disassembled and examined. The sleeves showed no reduction in diameter, where in usual service uncoated Co alloy sleeves can be reduced by up to 0.500" thickness. By contrast, the mating bushing of the support arm journal member (uncoated Co alloy) was severely worn. The wear mechanism had been borne entirely by the bushing during this trial. This result indicates the potential performance and economic benefits to be obtained by the disclosed coating material on functional aluminizing bath components.

In a second example, test rods were coated with molybdenum (Mo) and ceramic alumina-zirconia materials for dip test relating to the protection of roller surfaces during immersion in molten Al to guide the passage of steel strip for commercial steel mill Al coating operations. During such service, the work surfaces of Fe alloy rollers are subject to metallurgical reaction identical to that described above for their axle journals. Further, they experience abrasion by the many thousands of feet of strip passing their surface as they guide it submerged in the pot of molten Al. It is well known that a coating of ceramic oxide can be used to at least partially protect such surfaces. Directed practice is to apply a Ni-base alloy as a bond coat directly to the roller surface, followed by the ceramic. The ceramic is largely inert to the metallurgical attack by molten Al, and is effective at keeping the roll surface smooth and producing good quality aluminized strip. Ni, Co and other conventional metal alloys are not.

Eventually in a campaign, the ceramic coating cracks, allowing molten Al to seep, penetrating to the metallic bond coat and eventually to the roller surface. Localized metallurgical attack occurs, forming pits in the metal and spallation pits in the ceramic. As the ceramic coating, though pitted, continues in use to produce acceptable strip quality, said pitting enlarges and deepens the local areas until the ceramic spalls extensively and the surface becomes cratered, too rough to produce acceptable strip product, free of surface markings from the craters. The roller must then be removed for replacement and rework. This includes removal of the coating and machining of the roller surface to a depth below pit bottoms, then recoating, repeated for a number of times until the roller reaches a minimum useful diameter and must be replaced. Shutdown for removal is costly downtime and results in profit loss. Furthermore, the rework of rollers with deep surface craters is costly, and extensive material removal shortens the number of possible reuses for a roller, adding to process cost.

In this example, a method was utilized to act as a barrier to the direct metallurgical attack at the roller surface by first applying a primer coating of at least one of the disclosed refractory metals. Applied directly to the roller surface before the conventional Ni- or Co-based metal bond coat, it serves as a final barrier to hold off the metallurgical attack of roller surfaces by the molten Al encroaching through the outer layers and bond coat.

Said trial rods were coated by plasma thermal spray. They were affixed to holders and immersed into the molten Al bath of a steel mill performing commercial aluminizing of steel strip. Examination revealed the greater resistance to attack provided by Mo metal, compared to commonly-used NiCrAlY bond coat alloy. This method was then tested in the dynamic environment of roller surface coating at three steel mill facilities. Rollers were first prepared by grit blast roughening of the surface. They were then pre-heated to about 400° F. to properly prepare the surface for coating adhesion and to obtain a preliminary state of thermal expansion-contraction stress. A layer of Mo metal primer coating was applied 0.004–0.008" thick. Then a layer of conventional NiCrAlY bond coat was applied to a thickness of about 0.010". To this was applied a layer of 50% NiCrAlY with 50% $Al_2O_3$—$25ZrO_2$ composite of about 0.008" thickness, followed by a 0.020–0.035" thickness of the ceramic oxide alone.

Procedural care is taken to maintain pre-heat temperature, so as to assure excellent bonding and thermal stress state throughout the coating operations. Finally, a coating of essentially boron nitride was applied by brushing, to form a sealer providing an initial barrier which delays aluminum penetration through any ceramic crack network.

Rollers thus prepared were utilized in the dynamic environment of steel strip aluminizing, exposed to the actual bath metallurgical chemistries, temperatures and stresses. The roller surface life was extended well beyond the operational campaign limits of which the uncoated axle journals are normally capable and which thus become a campaign life limiting part. Furthermore, operators report the visual appearance of eventual pitting to be markedly reduced, such that rework depth of roller surfaces is likely reduced. The presence of the primer layer did not inhibit the bonding of the remaining coatings on the roller. The extension of functional roller campaign time and extended re-cycle life of used rollers provide valuable cost improvement and profitability by this disclosed method and its embodiments.

What is claimed is:

1. An article used in contact with molten aluminum or molten zinc which is coated with a high density coating consisting of a metal selected from the group consisting of Group Vb, VIb and VIIb metals, in pure or alloyed form.

2. The article of claim 1 in the form of a bearing, bushing, coupling or roller.

3. The article of claim 2 used in contact with molten aluminum.

4. The article of claim 3 wherein the coating has a thickness of from about 0.01 to about 0.30 inch.

5. The article of claim 4 wherein the coating consists of a Group VIb metal, in pure or alloyed form.

6. The article of claim 5 wherein the metal is selected from molybdenum, tungsten, and mixtures thereof.

7. The article of claim 6 wherein the metal is used in pure form.

8. The article of claim 1 wherein the metal is used in pure form.

9. The article of claim 7 wherein the coating is applied by a method selected from plasma transferred arc, welding overlay and high velocity arc spraying.

10. The article of claim 9 wherein the coating is applied by the plasma transferred arc method.

11. The article of claim 7 which includes an outer coating of an oxidation resistant material.

12. The article of claim 11 wherein the outer coating is selected from the group consisting of aluminum metal, zinc metal, NiCr, MCrAlY in which M is Ni or Co, and mixtures thereof.

13. The article of claim 10 wherein the coating has a thickness of from about 0.02 to about 0.06 inch.

14. An apparatus for coating metal strip with aluminum or zinc comprising a reservoir for holding molten aluminum or molten zinc and, positioned such that it is at least partially submersed in said molten aluminum or zinc, an article for supporting or moving the metal strip, said article selected from bearings, bushings, couplings and rollers, said article being coated with a high density coating consisting of a metal selected from the group consisting of Group Vb, VIb and VIIb metals, in pure or alloyed form.

15. The apparatus of claim 14 wherein the coating has a thickness of from about 0.01 to about 0.30 inch.

16. The apparatus of claim 15 used to coat metal strip with molten aluminum.

17. The apparatus of claim 16 wherein the coating consists of a Group VIb metal, in pure or alloyed form.

18. The apparatus of claim 17 wherein the article is coated with metal selected from molybdenum, tungsten, and mixtures thereof.

19. The apparatus of claim 18 wherein the article is coated with the metal in pure form.

20. The apparatus of claim 19 wherein the coating is applied by a method selected from plasma transferred arc, welding overlay, and high velocity arc spraying.

21. The apparatus of claim 20 wherein the coating is applied by the plasma transferred arc method.

22. The apparatus of claim 21 wherein the coating has a thickness of from about 0.02 to about 0.06 inch.

23. A roll for guiding steel strip through a high temperature aluminizing bath, said roll comprising a roll body having a surface in guiding contact with said steel strip within said bath and a multi-layer coating on said roll surface for contact with said steel strip, said multi-layer coating including a first primer layer on said roll surface comprising a Group Vb, VIb or VIIb metal, either as pure metal or an alloy; a second layer comprising MCrAlY metal in which M is Ni or Co; and a third layer comprising a refractory metal oxide of Al, Zr, Si or Cr, said third layer having a higher porosity than said second layer to better accommodate thermal expansion coincident with bath immersion without disruption of the third layer surface, while the less porous MCrAlY metal second layer and the first primer layer maintain effective oxidation protection of said roll surface.

24. The roll according to claim 23 wherein the first primer layer comprises molybdenum, tungsten, and mixtures thereof.

25. The roll according to claim 24 wherein the MCrAlY of the second layer is thermally sprayed on the first layer.

26. The roll according to claim 25 wherein the second layer is made from NiCrAlY.

27. The roll according to claim 26 wherein the third layer comprises a refractory metal oxide of zirconium or aluminum.

28. The roll according to claim 27 wherein the first layer comprises tungsten or molybdenum in pure form.

29. The roll according to claim 23 which, between the second and third layer, includes a blend layer which incorporates a mixture of from about 25% to about 75% by weight of the material in the second layer and from about 25% to about 75% by weight of the material in the third layer.

30. The roll according to claim 23 which includes a sealer coating on the outer surface of the coated roll.

* * * * *